United States Patent [19]

Boso et al.

[11] Patent Number: 4,685,185

[45] Date of Patent: Aug. 11, 1987

[54] METHOD OF MANUFACTURING AN INK JET HEAD

[75] Inventors: Brian Boso; Gerhard J. Beenen, both of Portland; Bruce Murdock, Beaverton, all of Oreg.

[73] Assignee: Tektronix, Inc., Beaverton, Oreg.

[21] Appl. No.: 902,261

[22] Filed: Aug. 29, 1986

[51] Int. Cl.$^4$ .......................... B21D 53/00; B23K 9/16
[52] U.S. Cl. ...................................... 29/157 C; 29/557;
29/527.2; 29/DIG. 4; 29/DIG. 13; 219/69 M;
346/140 R
[58] Field of Search ................. 29/157 C, 157 R, 557,
29/558, 527.1, 527.2, DIG. 4, DIG. 13;
204/129.1; 219/69 M, 69 R; 346/1.1, 140 R;
228/193, 245

[56] References Cited

U.S. PATENT DOCUMENTS

| | | | |
|---|---|---|---|
| 3,975,609 | 8/1976 | Martin et al. | 219/69 M |
| 4,112,436 | 9/1978 | Cone | 346/140 R |
| 4,282,533 | 8/1981 | Brooks et al. | 346/140 R X |
| 4,357,614 | 11/1982 | Tamai | 346/140 R X |
| 4,372,803 | 2/1983 | Gigante | 156/626 |
| 4,374,707 | 2/1983 | Pollack | 204/11 |
| 4,425,777 | 1/1984 | Jeglinski | 29/157 C X |
| 4,429,322 | 1/1984 | Dressler et al. | 346/140 R |
| 4,430,784 | 2/1984 | Brooks et al. | 29/157 C |
| 4,437,103 | 3/1984 | Ikeda | 346/140 R |
| 4,455,192 | 6/1984 | Tamai | 156/628 |
| 4,485,287 | 11/1984 | Hamasaki et al. | 219/69 M |
| 4,528,577 | 7/1985 | Cloutier et al. | 346/140 R |
| 4,549,188 | 10/1985 | Shackleton | 346/140 R X |
| 4,574,445 | 3/1986 | Bentin et al. | 29/157 C |
| 4,625,373 | 12/1986 | Duffield et al. | 29/157 C X |

FOREIGN PATENT DOCUMENTS

| | | | |
|---|---|---|---|
| 3029499 | 3/1982 | Fed. Rep. of Germany | 29/157 C |
| 168838 | 10/1982 | Japan | 29/157 C |
| 2030897 | 4/1980 | United Kingdom | 29/157 C |

OTHER PUBLICATIONS

Lane, R.; "Metal Membrane Nozzle for Ink Jet Printer", *IBM Technical Disclosure Bulletin*, vol. 19, No. 10 (Mar. 1977); p. 3984.

Huellemeier, J. M. and Kruspe, H. R.; "Ink Jet Nozzle Fabrication", *IBM Technical Disclosure Bulletin*, vol 20, No. 11A (Apr. 1978); p. 4485.

Gardner, W. R.; "Process for Fabrication of Ink Jet Orifices", *Xerox Disclosure Journal*, vol. 4, No. 2 (Mar.-Apr. 1979); pp. 251-252.

Primary Examiner—Howard N. Goldberg
Assistant Examiner—Ronald S. Wallace
Attorney, Agent, or Firm—John D. Winkelman; David P. Peterson

[57] ABSTRACT

An aperture plate for an ink jet head is formed by micro electrical discharge machining one surface of the plate to form a dimple-like recess with a relatively wide flat base. An aperture is then formed through the plate in the region of the dimple, as by micro electrical discharge machining. In one method of the invention, recesses are formed in two plates which are then mounted to the body of an ink jet head. A third plate with a formed third aperture is then mounted to the body such that the first, second and third plates overly one another and the third aperture is aligned with the recesses. Apertures of a smaller cross-section than the third aperture are then formed in the first two plates by drilling through the third aperture. The aperture through the first plate is then enlarged.

17 Claims, 5 Drawing Figures

METHOD OF MANUFACTURING AN INK JET HEAD

TECHNICAL FIELD

This invention relates to a method of manufacturing ink jet heads for ink jet printers and also to a method of manufacturing aperture plates for ink jet heads.

BACKGROUND OF THE INVENTION

Ink jet printers having one or more ink jet heads for projecting drops of ink onto paper or other printing medium to generate graphic images and text have become increasingly popular. To form color images, ink jet printers with multiple ink jet printing heads are used, with each head being supplied with ink of a different color. These colored inks are then applied, either alone or in combination, to the printing medium to make a finished color print. Typically, all of the colors needed to make the print are produced from combinations of cyan, magenta and yellow ink. In addition, black ink may be utilized for printing textual material or for producing true four-color prints.

In a common arrangement, the print medium is attached to a rotating drum and the ink jet heads are mounted on a traveling carriage that traverses the drum axially. As the heads scan paths over the printing medium, ink drops are projected from a minute external orifice in each head to the medium so as to form an image on the medium. A suitable control system synchronizes the generation of ink drops with the rotating drum.

In one basic type of ink jet head, ink drops are produced on demand. An exemplary drop-on-demand ink jet head is illustrated in U.S. Pat. No. 4,106,032 of Miura, et al. The Miura ink jet head has a two compartment ink chamber comprised of an inner horn compartment and an outer ink compartment separated by a horn compartment wall or first plate. These compartments communicate with one another through a first aperture or connecting channel which is provided through the horn compartment wall. Ink is delivered to the outer ink compartment of the ink jet head.

Whenever a drop of ink is needed, an electric pulse is applied to a piezoelectric crystal, causing the crystal to constrict. As a result, because the crystal is in intimate mechanical contact with ink in the horn compartment, a pressure wave is transmitted through the ink chamber. In response to this pressure wave, ink flows from the outer ink compartment and through an ink orifice passageway or second aperture. This orifice passageway passes through an ink chamber wall or second plate. Ink from the orifice passageway forms an ink drop at an internal ink drop-forming orifice outlet which is located at the outer surface of the ink chamber wall. An air chamber is provided adjacent to the ink compartment through which the ink drop from the orifice outlet travels. From the air chamber the ink drop passes through a main external orifice or third aperture which extends through an air chamber wall or third plate of the ink jet head. This latter orifice is coaxially aligned with both the first and second apertures and leads to the printing medium. Air under pressure is delivered to the air chamber and entrains the ink drop in a generally coaxial air stream as the ink drop travels through the air chamber. This air stream increases the speed of the drops toward, and the accuracy of applying the ink drops to, the print medium.

To reduce the length of the connecting channel and thereby enhance drop formation, the horn compartment wall is thinned in the region through which the connecting channel or first aperture passes. Typically, thinning is accomplished by removing material from the inner surface of the horn compartment wall. That is, material is removed from the surface which bounds the horn compartment to provide a dimple-like void or recess in this surface. As a result, the length of the first aperture or connecting channel is reduced. Similarly, the length of the second aperture or ink orifice passageway is reduced by removing material from the inner surface of the ink chamber wall. This forms another dimple-like recess in the portion of this wall through which the ink orifice passageway passes.

In one known manufacturing technique, the dimples are formed by chemically etching the horn compartment wall and the ink chamber plate. Thereafter, the connecting channel and ink drop-forming orifice passageways are punched or micro electrical discharge machined through the horn compartment plate and the ink chamber plate. The main external orifice of the ink jet head is then also formed through the air chamber plate in the same manner. These plates are thereafter attached to a body of the ink jet head. Attachment is performed under a microscope with a worker aligning the connecting channel, the ink orifice passageway and the external orifice as the ink jet head is assembled. This is an extremely labor intensive task. Also, it is very difficult to align the various apertures within required tight tolerances for operable ink jet heads. Therefore, the yield of satisfactory ink jet heads from this technique is in need of improvement.

In addition to etching, dimples have also been formed in ink jet head aperture plates by punching or stamping, such as disclosed in U.S. Pat. No. 4,282,533 of Brooks et al. However, this does not solve the problem of aligning apertures formed through the dimpled area of the various plates during assembly of the plates into an ink jet head. In addition, these approaches for forming recesses, as well as standard machining techniques, tend to produce tapered recesses. The thinnest portion of the plates are then at the relatively small pointed area or apex of the tapered recess. To provide apertures of the desired reduced length, the apertures must be formed at, or extremely close to, the pointed area of the recess. This further exacerbates the alignment problems. That is, the apertures not only must be properly aligned with one another, they also need to be aligned with the pointed area of the recesses.

As a further approach to manufacturing ink jet head aperture plates, a first sheet is provided with a first opening of a first dimension. A second much thinner sheet is brazed or otherwise fastened to the first sheet. A second opening, much smaller than the first opening, is drilled through the second sheet in substantial coaxial alignment with the first opening. In this method of manufacture, the first opening corresponds to the dimpled or thinned region of the overall aperture plate and the second opening corresponds to the aperture, as explained above. Again, the problem of aligning the various apertures as the ink jet head is assembled still exists in this approach. Furthermore, additional manufacturing steps are required to interconnect plural sheets to form each of the aperture plates.

Also, it has been proposed to form apertures through extremely thin plates rather than in dimpled or thinned regions of thicker plates. However, extremely thin aperture plates do not have sufficient rigidity for a number of applications. For example, difficulties are encountered when a single plate of this type is to be provided with plural apertures for use in an ink jet head array.

Ink jet heads of the non-air assisted type eliminate the air chamber plate and corresponding orifice. Because fewer orifices are required for this type of ink jet head, the difficulties of aligning multiple orifices are reduced somewhat. However, these difficulties are still present to some degree.

Therefore, a need exists for an improved method of manufacturing ink jet heads and ink jet head aperture plates, which is directed toward overcoming these and other disadvantages of prior art approaches.

SUMMARY OF THE INVENTION

In accordance with one aspect of the present invention, aperture plates for ink jet heads are formed by micro electrical discharge machining one surface of a plate to form a dimple-like recess with a relatively wide flat base. An aperture is then formed through the plate in the region of the dimple, as by micro electrical discharge machining. The length of the aperture is thereby reduced to less than the overall thickness of the plate because of the recess.

As another aspect of the invention, a method is described for manufacturing an ink jet head having a body which defines a horn compartment with first and second ends. A first plate is mounted to the body of the assembled ink jet head so as to close the first end of the horn compartment. This first plate has first and second opposed surfaces and a first aperture extending between such surfaces. Also, the first surface bounds the horn compartment. A second plate is also mounted to the body when the ink jet head is assembled and has first and second opposed surfaces. An ink compartment is provided between the first surface of the second plate and the second surface of the first plate. The ink compartment communicates with the horn compartment through the first aperture. A second ink drop-forming orifice passageway or second aperture extends between the first and second surfaces of the second plate. These apertures are coaxially aligned in the assembled ink jet head. In accordance with this method, a recess or dimple is formed in the first surface of the first plate and another recess or dimple is formed in the first surface of the second plate. In one method, each of these recesses are formed before the plates are mounted to the body. The first and second apertures are then formed in the plates, at the location of the recesses, after the plates are mounted in place.

In accordance with another aspect of this invention, the first and second apertures are formed by drilling through the first and second mounted plates in a continuous drilling step to provide first and second holes through the respective plates. The hole through the first plate is then enlarged by redrilling.

The method is also applicable to air assisted type ink jet heads which each have a third plate mounted to the body of the assembled ink jet head. The third plate also has first and second opposed surfaces. In addition, an air chamber is provided between the first surface of the third plate and the second surface of the second plate. This air chamber communicates with the ink compartment through the second aperture. In addition, the third plate has a main external orifice or third aperture which is coaxially aligned with the first and second apertures of the assembled ink jet head. The cross-sectional dimension of the third aperture is larger than the cross-sectional dimensions of the first and second apertures. Although not necessary, in one method the third aperture is formed prior to mounting the third plate to the body. In addition, the first and second apertures are formed by passing a drill through the third aperture and then drilling through the second and first plates in a continuous drilling step to form holes through these plates. Thereafter, the hole through the first plate is enlarged by redrilling.

As a more specific aspect of the invention, each of the recesses and apertures are formed by micro electrical discharge machining or drilling.

In addition, each of the mounting steps may comprise a brazing step. Furthermore, after the apertures are formed, a diaphram is mounted to the body to close the end of the horn chamber farthest from the first plate.

It is accordingly an overall object of the invention to provide an improved method of manufacturing aperture plates for ink jet heads.

It is another overall object of the invention to provide an improved method of manufacturing ink jet heads, including ink jet heads of the air assisted and non-air assisted types.

It is a further object of the invention to provide a method of manufacturing individual ink jet heads, as well as arrays of ink jet heads.

It is still another object of the invention to provide a method of manufacturing ink jet head aperture plates at a relatively low cost and which improves the yield of satisfactory aperture plates.

A still further object of the invention is to provide a method of manufacturing ink jet heads which minimizes problems associated with aligning apertures through plural aperture plates that are incorporated into such ink jet heads.

It is another object of the invention to provide a method of manufacturing ink jet heads which increases the allowable tolerances of ink jet head components and at the same time results in a high yield of satisfactory ink jet heads.

Still another object of the present invention is to provide a method of more accurately manufacturing ink jet aperture plates and ink jet heads to desired dimensions.

These and other objects, features and advantages of the present invention will become apparent with reference to the following description and drawings.

DETAILED DESCRIPTION OF PREFERRED EMBODIMENTS

Figure 1:
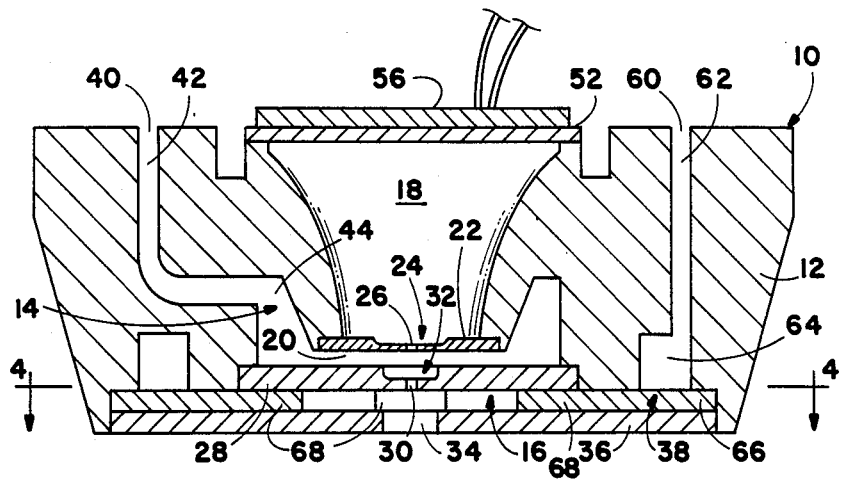
FIG. 1 is a vertical sectional view of an ink jet head which has been manufactured in accordance with the method of the present invention.

With reference to FIG. 1, an ink jet head 10 includes a body 12 within which an ink chamber 14 and an air chamber 16 are provided. The illustrated ink chamber is of plural compartment construction with a horn compartment 18 and an ink gap or ink compartment 20. Compartments 18 and 20 are separated by a first internal horn closure wall or first plate 22 through which a first internal opening or aperture 26 is provided. To reduce the length of the first aperture 26, and thereby enhance the performance of the ink jet head, the interior surface of plate 22 adjacent horn compartment 18 is provided with a thinned or recessed region 24. Recess 24 is of a circular dimple-like shape as described more fully below.

The ink chamber 14 is separated from the air chamber 16 by an ink chamber wall or second plate 28. The ink chamber communicates with the air chamber through an internal ink passageway or second aperture 30 which passes through plate 28. The interior surface of ink chamber plate 28 is provided with a circular recessed region or dimple 32. This recess reduces the length of the ink passageway 30 and facilitates the formation of ink droplets at the outlet of this passageway. An external ink jet orifice or third aperture 34 is coaxially aligned with ink passageway 30 and the internal orifice 24. This third aperture extends from the air chamber 16, through an external air chamber wall or third plate 36, and to the exterior of the ink jet head 10. A spacer 38, described below in connection with FIG. 4, separates external plate 36 from ink chamber wall 28. The spacer 38 maintains a substantially constant width air gap 16 between the plates 28, 36 and rigidifies the ink jet head construction. The plates 22, 28 and 36, as well as spacer 38, are mounted to the body 12 as explained below.

In general, ink under pressure is delivered to an ink receiving inlet 40 of the body 12 and fills the ink containing portions of the ink jet head. Specifically, the ink flows through inlet 40 and fills a passageway 42, an annular channel 44, and the ink gap 20 between plates 22 and 28. Ink also enters the horn compartment 18 through the first aperture 26. The recesses 24, 32 and the passageway 30 are also filled with ink.

The outer end of the horn compartment 18 (FIG. 1) is closed by a flexible diaphragm or membrane 52. An actuator 56, which may comprise a piezoelectric crystal, is stimulated by electrical pulses. In response to each pulse, a pressure wave is transmitted through the horn compartment 18. This causes the ejection of an ink droplet from the outlet of ink drop forming passageway 30 and toward the external orifice 34.

Figure 4:
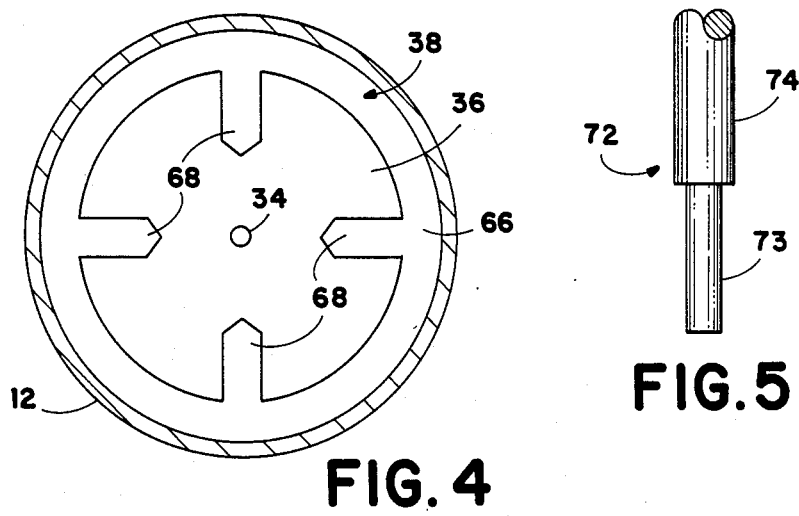
FIG. 4 is a sectional view of the ink jet head of FIG. 1, taken in the direction of line 4—4 of FIG. 1.

Pressurized air is delivered to the ink jet head 10 at an inlet 60. This air flows through a passageway 62 and into an annular channel 64 which distributes the air about the circumference of the ink jet head. This air passes spacer 38 and enters the air gap or chamber 16 between the outer surface of ink chamber wall plate 28 and the interior or inner surface of the air chamber wall plate 36. As shown in FIG. 4, spacer 38 comprises a circular ring 66 of a thickness which is substantially equal to the width of the air gap. Fingers or tines 68, spaced ninety degrees apart, project inwardly toward the center of the ring as shown. With this construction, air enters the air chamber 16 through the regions between the tines.

More specifically, air flows inwardly in all directions from the channel 64 and toward the center of the ink jet head. As this air approaches the center of the head, it is deflected outwardly through the external orifice 34. That is, the inwardly flowing air is deflected in a direction which is generally normal to the plane of the outer surface of ink chamber wall 28. An optional conical or other projection, not shown, may be located on the outer surface of plate 28 to aid in this deflection. Typically, aperture 30 would extend through any such projection. This air flow accelerates ink drops generated in response to pressure pulses and assists in carrying them outwardly from the ink jet head. As a result, uniform and symmetric ink drops are generated by the ink jet head. These drops travel along a straight path through the external orifice 34 and toward the print medium.

Each of the components of the ink jet head of FIG. 1 is typically manufactured of stainless steel or other material which is resistant to corrosion by the ink. In addition, with reference to FIG. 2, body 12 may be of unitary construction. The body may be formed by machining a circular stainless steel rod to provide boundaries for the horn and ink gap compartments, as well as the ink and air passageways.

It should be noted that non-air assisted ink jet heads may be manufactured by eliminating the air gap 16, spacer 38, and exterior plate 36, as well as the various air supply passageways. In addition, certain ink jet head constructions not only eliminate the air assist, but also utilize a single compartment ink chamber bounded by a single plate such as 22. The manufacturing methods described below apply equally to these various constructions. However, greater manufacturing cost savings and efficiencies result when the method is used to manufacture an ink jet head of the type shown in FIG. 1. These manufacturing methods will next be described in connection with FIGS. 2, 3 and 5.

In general, the preferred approach for manufacturing the ink jet head of FIG. 1 is as follows. Initially, the dimples 24 and 32 are formed in the respective first and second plates 22, 28. This step is typically performed before the plates 22 and 28 are mounted to the body 12. In accordance with an alternate method of the invention, one could form the dimple 24 after plate 22 is mounted to the body and before diaphram 52 is in place. However, this would reduce the yield of suitable assembled ink jet heads. That is, although a relatively high percentage of satisfactory plates 22 are produced using techniques explained below, some plates do not meet manufacturing tolerances. Assume that dimple 24 is formed after plate 22 is mounted to the body 12. In this case, if an unsatisfactory dimple results, the partially assembled ink jet head comprising the body, plate 22 and plate 28 would have to be rejected. In contrast, by dimpling the plates prior to mounting them to the body, only the relatively inexpensive and easily formed aperture plates need to be discarded in the event an unsatisfactory dimple results.

The third aperture or orifice 34 is formed through the plate 36. As is apparent from FIG. 3 and Table 1 below, aperture 34 has a cross-sectional dimension which is greater than the cross-sectional dimensions of the apertures 26 and 30. The plate 22 is then mounted to the body. Following this, the plate 28, spacer 38 and plate 36 are mounted in place.

Thereafter, a drill is passed through the orifice 34 and used to drill the aperture 30 through the plate 28 and another hole of similar size through the plate 22. The drill is sized to produce a hole of the correct cross-sectional dimension for aperture 30, which is of a smaller cross-sectional dimension than the aperture 26. The relatively wide dimples, produced as explained below, help to insure that holes drilled in this manner will pass through the thinnest regions of the plates. In contrast, dimples made by conventional chemical etching or punching techniques typically are highly tapered. Consequently, these prior approaches make the aperture plates more difficult to manufacture because the holes have to be positioned at the taper in order to intersect the thinnest region of the plates. It should also be noted that the blind aperture drilling technique of the present invention eliminates the need to align plural pre-drilled apertures as aperture plates are incorporated into an ink jet head.

After the above described drilling step, the assembly is typically rotated by 180 degrees so that dimple 24 faces the drill. The drill is then changed to bore a hole of a larger cross-sectional dimension corresponding to the size of aperture 26. The aperture 26 is then completed by redrilling and enlarging the hole that was previously drilled during the formation of aperture 30.

In accordance with an alternate method of the present invention, a drill of a size for producing an aperture of the cross section of aperture 30 may be used to simultaneously drill the plates 36, 28 and 22. Thereafter, plate 36 may be redrilled to the larger cross-sectional dimension of aperture 34. In addition, the hole through plate 22 may similarly be redrilled to the proper size of aperture 26. Although this approach is within the scope of the present invention, it is typically faster and more accurate to drill the aperture 34 prior to mounting plate 26 to the body.

In general, suitable dimensions of the various components of the ink jet head of FIG. 1 are identified in Table 1. In this table, the symbol $w_1$ represents the width or diameter of the flat portion of the base of dimple 24. In a like manner, the symbol $w_2$ represents the width or diameter of the flattened base portion of the dimple 32. As can be seen from the table, the flattened portions $w_1$ and $w_2$ are typically of a relatively large dimension. This facilitates drilling of apertures 26, 30 and 34 in alignment with one another and with the apertures 30 and 26 passing through the thinned base portions of the respective dimples 32 and 24. That is, the flattened portion of the recesses automatically overly one another and are in line with aperature 34 when the plates are mounted to the body. Therefore, no prealignment of these plates is required during mounting.

Figure 5:
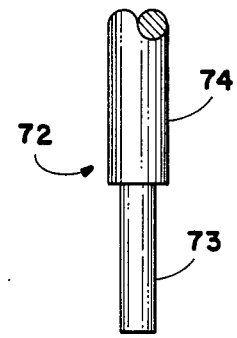
FIG. 5 illustrates the tip of an electrode utilized in micro electrical discharge machining of the aperture plates of the ink jet head of FIG. 1.

Micro electrical discharge machining is employed in the preferred approach (but is not the only approach) for forming recesses 24, 32 and the apertures 26, 30 and 34. Micro electrical discharge machining is not known to the inventors to have been used to form dimples in ink jet aperture plates, but this technique has been used to form apertures. Formation of dimples in this manner produces dimples with an extremely smooth finish and does not leave any appreciable burr on the parts. FIG. 5 illustrates a suitable and conventional electrode assembly 72 used in micro electrical discharge machining of the dimples and apertures. The electrode assembly has a wire electrode 73 and a guide sleeve 74 as shown. The electrode assembly is coupled to a commercially available electrical discharge machining apparatus, such as from Matsushida Company of Japan. In addition, commercially available electrode materials are employed in the manufacturing of the aperture plates. Suitable materials for the electrode components include tungsten and a copper/tungsten alloy electrode wires.

Typically, an electrical discharge machining electrode is rotated and a low energy electrical discharge is emitted between the electrode and the workpiece. This discharge removes material from the workpiece in a highly controllable manner. In addition, the depth of the recesses can be precisely controlled using this technique. With this technique, dimples 24, 32, with relatively wide flattened bottoms, can be produced at a relatively low cost and with higher yields at this cost than in other known techniques. In addition, as explained above, wide flat bottomed dimples minimize alignment problems. That is, the apertures do not have to be precisely centered on the dimples in order to pass through the thinnest portion of the respective plates. In addition, this technique is suitable for manufacturing ink jet heads with any number of plates. The flat areas of the dimples of these plates are simply mounted to overlay one another and the apertures are drilled through these flat areas. Also, this technique may be employed in manufacturing ink jet head arrays, typically of relatively small size.

As pointed out above, in the preferred approach the aperture 34 is drilled prior to the mounting of plate 36 to the body 12. It is faster and more accurate to predrill aperture 34, rather than to do so after plate 36 is mounted in place. In general, to provide apertures with straight side walls, the tip of a cylindrical electrical discharge wire electrode must pass through and beyond the drilled portion of the plate a distance which is equal to one full depth of the drilled portion. This exposes the drilled portion to nontapered regions of the electrode which are spaced from the electrode tip, as the tip itself becomes tapered during machining operations. The plate 36 is typically much thicker than the air gap 16. Consequently, one cannot drill aperture 34 by passing the electrode tip a full depth of plate 36 beyond the aperture. This would result in an undesired drilling of the plate 28. It is possible to stop the drilling of aperture 34 short of the plate 28. Therefore, this method is within the scope of the invention. However, this can result in apertures 34 with tapered side walls and, in some circumstances, can impair the performance of the resulting ink jet head.

Figure 2:
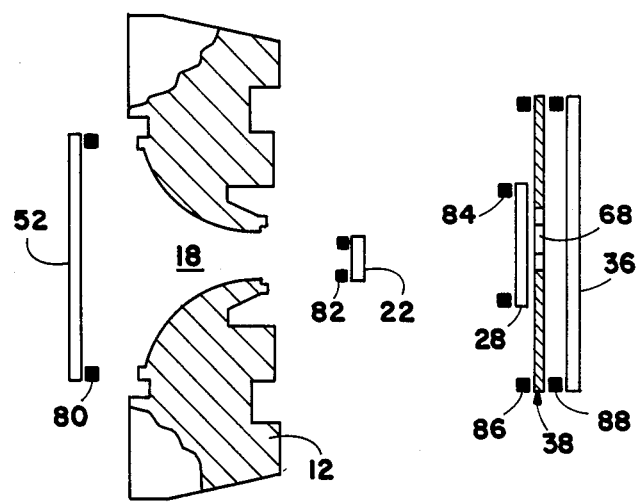
FIG. 2 is an exploded view, partially in section, of components incorporated into the ink jet head of FIG. 1 prior to their assembly.
Figure 3:
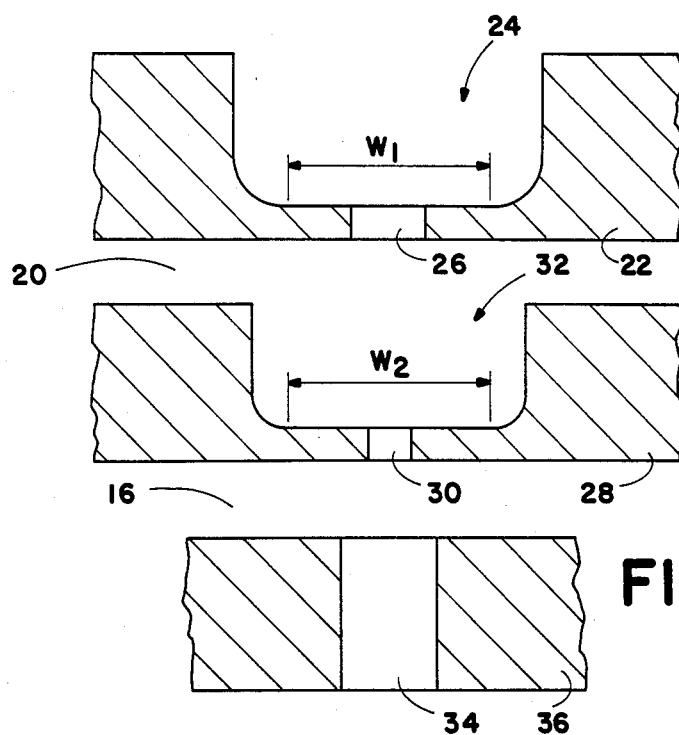
FIG. 3 is an enlarged view of aperture plates included in the ink jet head of FIG. 1 and which have been manufactured in accordance with the method of the present invention.

Referring to FIG. 2, each of the mounting steps typically comprises a brazing step. As shown in FIG. 2, commercially available braze rings 80-88 are positioned as shown relative to the components. The braze rings are typically of a commercially available nickel-gold alloy, such as 81-83% gold and 19-17% nickel (AMS-4787; BAu-4). When pure, the alloy melts at a first temperature. During melting, there is some diffusion of the gold and nickel into the adjacent stainless steel components. This diffusion changes the percentage composition of the alloy and raises its remelting temperature. Consequently, during a subsequent brazing operation, previously brazed joints do not melt because the temperatures at the joint are below the remelting temperature. Also, the spacer 38 may be coated with an electroformed layer of silver braze material which assists in securing the plate 28, spacer 38 and plate 36.

TABLE 1

| Parameter | Microns |
| --- | --- |
| Aperture 26 Diameter | 66 |
| Aperture 30 Diameter | 44 |
| Aperture 34 Diameter | 120 |

TABLE 1-continued

| Parameter | Microns |
| --- | --- |
| Ink Gap Spacing (measured from Dimple 24 Bottom to Dimple 32 Bottom) | 255 |
| Air Gap 16 Spacing | 90 |
| Dimple 24 Diameter | 600 |
| Dimple 24 Diameter $w_1$ Base of Dimple | 350 |
| Dimple 32 Diameter | 350 |
| Dimple 32 Diameter at Base of Dimple | 200 |

In addition, the flat bottoms $w_1$ and $w_2$ of dimples 24 and 32 are within ±one micron of being flat. Also, the dimples 24 and 32 are centered within fifty microns of the center of the plates 22, 28. In addition, the aperature 34 is centered within fifty microns of the center of plate 36.

It should be noted that the parameters and dimensions listed in Table 1 are exemplary for the ink jet head of FIG. 1. These parameters and dimensions may be varied, while still employing the manufacturing methods of the present invention, in order to manufacture ink jet heads of other configurations.

Having illustrated and described the principles of our invention with respect to several preferred embodiments, it should be apparent to those persons skilled in the art that such invention may be modified in arrangement and detail without departing from such principles. We claim as our invention all such modifications as come within the true spirit and scope of the following claims.

We claim:

1. A method of manufacturing an aperture plate for an ink jet head, the aperture plate having first and second opposed surfaces, comprising:
    micro electrical discharge machining the first surface of the aperture plate to form a recess of a first cross-sectional dimension in the first surface;
    forming an aperture through the aperture plate between the first and second surfaces at the location of the recess, the aperture having a second cross-sectional dimension which is smaller than the first cross-sectional dimension of the recess.

2. A method according to claim 1 in which the aperture is formed by micro electrical discharge machining.

3. A method according to claim 1 in which the aperture is formed after the recess is formed.

4. A method according to claim 3 in which the aperture is micro electrical discharge machined from the second surface toward the first surface.

5. A method of manufacturing an ink jet head of the type having a body which defines a horn compartment with first and second ends, a first plate mounted to the body when the ink jet head is assembled so as to close the first end of the horn compartment, the first plate having first and second opposed surfaces and a first aperture communicating between such surfaces, the first surface of the first plate bounding the horn compartment, a second plate mounted to the body when the ink jet head is assembled and having first and second opposed surfaces, the first surface of the second plate and second surface of the first plate defining an ink compartment therebetween which is in communication with the horn compartment through the first aperture, the second plate having a second ink drop-forming orifice passageway or second aperture communicating between the first and second surfaces of the second plate, the first and second apertures being coaxially aligned, comprising:
    forming a first recess in the first surface of the first plate;
    forming a recess in the first surface of the second plate;
    mounting the first and second plates to the body;
    forming the first and second apertures through the first and second plates and at the location of the recesses after the first and second plates are mounted to the body.

6. A method according to claim 5 in which the second recess is formed in the first surface of the second plate prior to mounting the second plate to the body.

7. A method according to claim 5 in which the first and second recesses are formed in the respective first surfaces of both the first and second plates prior to the mounting of the plates to the body.

8. A method according to claim 7 in which the step of forming the first and second apertures comprises the steps of drilling through the first and second plates in a first continuous drilling step to form first and second holes through the respective first and second plates and then redrilling the first hole to a cross-sectional dimension which is larger than the cross-sectional dimension of the second hole, the first and second holes comprising the first and second aligned apertures.

9. A method according to claim 8 in which the first and second recesses are formed by micro electrical discharge machining and the first and second apertures are also formed by micro electrical discharge machining.

10. A method according to claim 5 in which the ink jet head is of the type which has a third plate mounted to the body when the ink jet head is assembled, the third plate having first and second opposed surfaces, the first surface of the third plate and the second surface of the second plate defining an air chamber therebetween which is in communication with the ink compartment through the second aperture, the third plate having a main external orifice or third aperture which communicates between the first and second surfaces of the third plate, the first, second and third apertures being coaxially aligned, the method further comprising:
    mounting the third plate to the body;
    forming the third aperture through the third plate, the third aperture being of a larger cross-sectional dimension than the cross-sectional dimensions of the first and second apertures; and
    the step of forming the first and second apertures comprises the steps of passing a drill through the third aperture and drilling through the second and first plates in a first continuous drilling step to form holes through the respective second and first plates, the hole through the second plate comprising the second aperture, and then redrilling the first hole through the first plate to a cross-sectional dimension which is larger than the cross-sectional dimension of the second hole, the first aperture comprising the redrilled hole through the first plate.

11. A method according to claim 10 in which the first recess is formed prior to the step of mounting the first plate to the body and the second recess is formed prior to the step of mounting the second plate to the body.

12. A method according to claim 11 in which the step of forming the third aperture comprises the step of forming the third aperture prior to mounting the third plate to the body.

13. A method according to claim 11 in which the first and second recesses are each formed by micro electrical discharge machining.

14. A method according to claim 13 in which the first and second recesses are formed by micro electrical discharge machining and each of the first, second and third apertures are formed by micro electrical discharge machining.

15. A method of manufacturing an ink jet head of the type having a body which defines a horn compartment with first and second ends, a first plate mounted to the body when the ink jet head is assembled so as to close the first end of the horn compartment, the first plate having first and second opposed surfaces and a first aperture communicating between such surfaces, the first surface of the first plate bounding the horn compartment, a second plate mounted to the body when the ink jet head is assembled and having first and second opposed surfaces, the first surface of the second plate and second surface of the first plate defining an ink compartment therebetween which is in communication with the horn compartment through the first aperture, the second plate having a second ink drop-forming orifice passageway or second aperture communicating between the first and second surfaces of the second plate, the first and second apertures being coaxially aligned, a third plate mounted to the body when the ink jet head is assembled, the third plate having first and second opposed surfaces, the first surface of the third plate and the second surface of the second plate defining an air chamber therebetween which is in communication with the ink compartment through the second aperture, the third plate having a main external orifice or third aperture communicating between the first and second surfaces of the third plate, the first, second and third apertures being coaxially aligned, comprising:

micro electrical discharge machining a first recess in the first surface of the first plate prior to mounting the first plate to the body;

micro electrical discharge machining a second recess in the first surface of the second plate prior to mounting the first plate to the body;

micro electrical discharge drilling the third aperture through the third plate prior to mounting the third plate to the body, the third aperture being of a larger cross-sectional dimension than the first and second apertures;

mounting the first, second and third plates to the body;

thereafter passing a micro electrical discharge drill through the third aperture and micro electrical discharge drilling through the second and first plates in sequence to form holes through the respective second and first plates, the hole through the second plate comprising the second aperture; and passing a micro electrical discharge drill through the horn chamber to the first plate and micro electrical discharge drilling the hole through the first plate to enlarge this hole and form the first aperture.

16. A method according to claim 15 including the subsequent step of mounting a diaphram to the body to close the second end of the horn chamber.

17. A method according to claim 16 in which each of the mounting steps comprises a brazing step.

* * * * *